United States Patent
Sahlman

(10) Patent No.: US 7,948,868 B2
(45) Date of Patent: May 24, 2011

(54) METHOD AND ARRANGEMENT RELATING TO THE INSERTION OF PILOT TONES IN THE FREQUENCY DOMAIN IN SC-FDMA

(75) Inventor: Karl-Göstra Sahlman, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 152 days.

(21) Appl. No.: 12/377,942

(22) PCT Filed: Aug. 18, 2006

(86) PCT No.: PCT/SE2006/050289
§ 371 (c)(1),
(2), (4) Date: Feb. 18, 2009

(87) PCT Pub. No.: WO2008/020791
PCT Pub. Date: Feb. 21, 2008

(65) Prior Publication Data
US 2010/0142364 A1    Jun. 10, 2010

(51) Int. Cl.
*H04J 11/00* (2006.01)
(52) U.S. Cl. .................. 370/210; 375/260
(58) Field of Classification Search .............. 370/321, 370/344; 455/571; 375/260, 140, 295
See application file for complete search history.

(56) References Cited

U.S. PATENT DOCUMENTS

| | | | | |
|---|---|---|---|---|
| 7,675,982 B2* | 3/2010 | Zhang et al. | ............ | 375/260 |
| 7,715,492 B2* | 5/2010 | Seki | ............ | 375/295 |
| 7,769,075 B2* | 8/2010 | Hosseinian et al. | ............ | 375/140 |
| 2005/0238110 A1* | 10/2005 | Yun et al. | ............ | 375/260 |
| 2007/0004465 A1* | 1/2007 | Papasakellariou et al. | ... | 455/571 |
| 2007/0165588 A1* | 7/2007 | McCoy | ............ | 370/344 |
| 2007/0242598 A1* | 10/2007 | Kowalski | ............ | 370/206 |
| 2009/0274103 A1* | 11/2009 | Yang et al. | ............ | 370/329 |
| 2010/0080113 A1* | 4/2010 | Yang et al. | ............ | 370/210 |

FOREIGN PATENT DOCUMENTS

WO    2007/024932 A1    3/2007

OTHER PUBLICATIONS

Ofuji, Y. et al. "Frequency Domain Channel-Dependent Scheduling Employing and Adaptive Transmission Bandwidth for Pilot Channel in Uplink Single-Carrier-FDMA Radio Access." IEEE 63rd Vehicular Technology Conference, 2006 (VTC 2006-Spring), vol. 1, pp. 334-338.

* cited by examiner

*Primary Examiner* — Albert Chou
(74) *Attorney, Agent, or Firm* — Coats & Bennett, P.L.L.C.

(57) ABSTRACT

The present invention relates to a method and arrangement for enhancing efficiency of transmission using Single Channel-Frequency Division Multiple Access (SC-FDMA). The method comprises the step of: applying a Discrete Fourier Transformation (DFT) of time signal providing No samples in a first resulting signal, inserting N1 pilot tones in said resulting signal providing No+N1 tones, Interpolating said signal provided with No+N1 tones to a required size, N, by insertion of zero bins in a middle section of said DFT providing a modified signal, applying Inversed Fast Fourier Transform (IFFT) on said modified signal, and performing a cyclic prefix insertion before transmitting the modified signal. Thus, similar equalizing techniques as for OFDM are possible for efficacy signal reception.

12 Claims, 12 Drawing Sheets

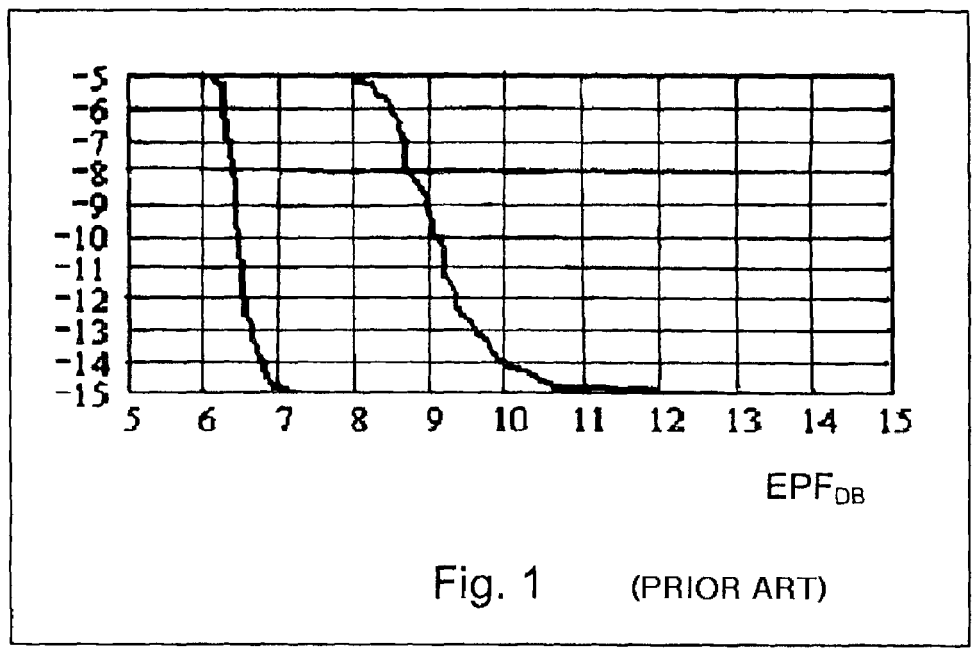
Fig. 1    (PRIOR ART)
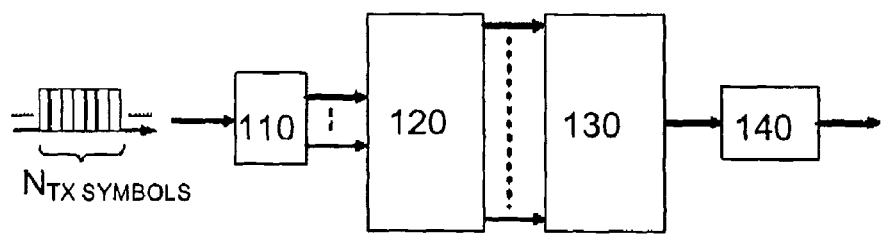
Fig. 2
(PRIOR ART)

METHOD AND ARRANGEMENT RELATING TO THE INSERTION OF PILOT TONES IN THE FREQUENCY DOMAIN IN SC-FDMA

TECHNICAL FIELD

The present invention relates to a method and arrangement in a communication network generally and in user equipments specially. In particular, the invention is a method for improving the efficiency of a mobile system using SC-FDMA modulation.

BACKGROUND OF THE INVENTION

In some cellular radio network standards, a common Radio Base Station (RBS) may instantaneously transmit to several User Equipments (UE), using Orthogonal Frequency Division Multiplexing (OFDM) within the available bandwidth, i.e. the bandwidth allocated for the RBS transmission in one cell.

OFDM modulation gives high EPF (Envelope Peak Factor), which reduces the available power from a user equipment. In a Radio Base Station peak reduction methods (clipping) are often used to reduce the ratio between the peak power and the average power of the sent signal. The added peak reduction energy can be distributed to all carriers within the radio bandwidth or located to special reserved tones carrying no data for OFDM. When locating the peak reduction energy to all tones within the bandwidth errors are introduced to the tones carrying information. A measurement of how much error that is introduced is the Error Vector Amplitude (EVM) measurement. Low EVM means small distortion of the message sent and received. The envelope peak reduction methods are often only implemented in the RBS as a mobile User Equipment is hardware limited and can not afford the added digital hardware used for clipping. This means that the analogue power amplifier for the OFDM user equipment in Up-link (UL) has to be designed for higher peak power capability than the base station. This will limit the available transmit power from the UE when also considering the available power from the UE battery. Mobile systems are often UL power limited as the case for OFDM.

Therefore, the use of Localized- or Distributed Single carrier modulations for the UE are proposed in order to reduce the EPF and provide higher user equipment analogue power for transmission in the power amplifier. The SC-FDMA signals are in contrary to OFDM generated from modulation symbols in the time domain and will give less EPF for the same type of modulation used in OFDM.

A commonly used modulation like QPSK gives low EPF and low data transfer availability, while 16-QAM and 64-QAM have higher EPF and higher data transfer. The drawback is that low EPF signal modulation will decrease the available data rate for the transmission A preferred aspect of OFDM modulation is the availability to insert pilot tones in the transmitted symbol or time signal. The pilot tones are used to calibrate the radio channel and the receiver frequency dependent errors mainly occurring in the receiver filtering. Normally receiver filtering is implemented as SAW-filters (Surface Acoustic Wave Filters) due to the need of good receiver selectivity. Such a receiver may introduce 10-15% EVM mainly emerging from the receiver filtering. But by using the pilot tones spread over the radio channel bandwidth, the frequency response over the channel and the receiver filtering is calibrated and the EVM influence can almost be eliminated leaving the an OFDM receiver. EVM values in the range of 2-3% typical can be achieved emerging mainly from frequency generation phase noise in the used oscillators of the receiver and the transmitter.

The large EPF of OFDM can be reduced by reserving an amount of optimally spread reserved tones for peak reduction. The peak cancelling energy is allocated to the reserved tones which carries no data. In this case the peak reduction does not introduce any errors into the tones carrying data information. FIG. 1 shows the EPF reduction in an OFDM 20 MHz channel using two stage clip application with Gaussian spread pilot tones occupying 6.25% of the available tones of the OFDM modulation. As the clipping functionality only uses the reserved tones, the peak reduction of the OFDM signal EVM is not increased for the tones used for the transmitted message. In the figure the left curve is representing the clipped performance and the right curve is the original OFDM EPF distribution.

By reserving tones for both calibration and clipping in OFDM a certain percentage of the available data rate in the channel is lost. The pilot tones for receiver calibration do not always need to be transmitted and can be transmitted in certain intervals depending on the radio channel changes. Different pilot selections can also be made over a block of sent time signals so the whole block will use the summed pilot tone responses for calibration in the reception.

The EPF reduction by peak clipping is done for reducing the size and DC-power needed for the RF power amplifiers used to provide the OFDM-modulation in the air interface. The pilot tone calibration technique improves the reception of OFDM by providing better C/I (Carrier to Interference ratio) for the received OFDM message.

FIG. 2 illustrates the procedure of generation of localised Single Channel-Frequency Division Multiple Access (SC-FDMA) and distributed SC-FDMA modulations in known art. This is described in 3GPP standardization technical reports: 3GPP TR25.814 V0 3.01.

No-symbols are generated in time domain, wherein No is the used number of carriers allocated to the radio channel. The symbols can be Quadrature Phase-Shift Keying (QPSK), 8 Phase Shift Keying (8-PSK), 16-Quadrature Amplitude Modulation (16QAM) or other higher order linear modulations. A Discrete Fourier Transform (DFT) 110 of size No tones or bins is generated. The No tones are then mapped (sub carrier mapping 120) into a radio channel with tones numbers size greater than N. The size of the radio channel is $2^n$ tones like 512, 1024 or 2048 etc where the Fast Fourier Transform (FFT) 130 can be executed efficiently. Then a new time function is created by inverse FTT techniques (IFFT). Cyclic prefix and ramp window for the symbol to be transmitted are added 140 and the symbol is transmitted over the radio interface.

The preference for SC-FDMA modulation in the UL in a mobile system is the lower EPF achieved for the modulation. As the message symbols are generated in the time domain EPF figures are like the achievable EPF for the modulation used. $\pi/4$-QPSK gives the lowest EPF and thus power consumption and complexity of the user equipment Analogue Radio Frequency (RF)-transmitter. The drawback is the rather high EVM occurring in reception of SC-FDMA, if the receiver frequency response is not calibrated. The equalising techniques must be done in the time domain.

The aim of reducing the EPF of the user equipment modulation will give reduced data rate in the user equipment and there are no methods to use pilot tones within the modulation symbol to improve the reception of SC-FDMA symbol. Methods to use a whole symbol for calibration tones are although available. Training sequences can be put into the time domain which then implies that the reception of SC- FDMA needs advanced equalisers used in other linear modulations used in GSM and WCDMA systems. The availability of such timed domain designed equalisers intended for taking care of the receiver introduced EVM is limited, without introducing very large amount of training sequences in the modulation.

In order to use the fairly simple equalising techniques used for OFDM, calibration tones are required. This is not so efficient when using SC-FDMA modulation. To provide pilot tones for calibration, an entire IFFT time sequence must be used. The known art of generating calibrating tones is as follows: The message for providing calibration tones in SC-FDMA to be sent is No/X long X-times repeated in the time domain. This gives that the time sequence sent will be used only for channel and receiver calibrating without any further information available in this message. Tones for calibration will be at equal intervals of X tones. How often the calibration message will be needed is dependent on the radio channel variation versus time.

The problem with the known art LC- or SC-FDMA modulation methods are:
  low order modulation must be used because of EPF demands from the user equipment reduces the achievable data rate,
  the EPF improvement by peak reduction is complex and introduces EVM on the transmitted signal,
  equalising in the time domain is needed
  availability to provide receiver calibration and use frequency domain equalisers as for OFDM is limited and reduces the data rate more than for an OFDM modulation.

SUMMARY OF THE INVENTION

Thus, it is an object of the present invention to solve the above mentioned problems by applying methods of this invention to Localized- or Distributed-SC-FDMA signals.

Other advantages of the invention include:
  The modified SC-FDMA modulation will be as efficient in data rate as for OFDM-modulation use.
  Lower EPF than for OFDM is achievable meaning more transmitted power will be available at the air interface also when applying reserved tone allocation for EPF reduction.
  Reuse of OFDM equalizing techniques will reduce cost of equalising at the extent of adding a reduced size IFFT in the receiver signal processing compared to OFDM reception.

For these reasons a method of enhancing efficiency of a transmission using Single Channel-Frequency Division Multiple Access (SC-FDMA) is provided. The method comprises the step of:
  a) applying a Discrete Fourier Transformation (DFT) of a time signal providing No samples resulting in a first signal,
  b) inserting N1 pilot tones in said first signal resulting in a DFT signal providing No+N1 tones,
  c) Interpolating said DFT signal to a required size, N, greater than No+N1, by insertion of zero tones of said DFT providing a modified frequency domain signal of N tones, where $N=2^m$, wherein m is an integer,
  d) applying Inversed Fast Fourier Transform (IFFT) on said modified signal, and
  e) performing a cyclic prefix insertion before transmitting the modified signal.

Preferably an additional step of performing optional power ramp windowing of the time signal before transmitting is carried out. The pilot tone spacing may be one of equidistant or randomly spread.

According to one aspect of the invention, the step b) is changed to insert N2 reserved tones giving a signal consisting of No+N2 tones. According to another aspect of the invention, the step b) is changed to insert N1 pilot tones and N2 reserved tones giving a signal consisting of No+N1+N2 tones.

Preferably, a further step is introduced for Envelope Peak Factor (EPF) reduction, said step comprising, after step b, having N2 numbers of reserved tones available, allocating a peak reduction energy allocated to the N2 reserved tones.

The received signal is processed by a method comprising: performing a channel estimation in the frequency domain using an N size FFT of the received signal, removing eventual extra pilot or reserved tones transmitted and tones corresponding to the transmitted zero tones and reducing said FFT size from N to No tones, and recovering the original No samples long time signal by an Inverse DFT (IDFT) operation.

The invention also relates to an arrangement for processing a signal for transmission using Single Channel-Frequency Division Multiple Access (SC-FDMA). The arrangement comprises a symbol receiving portion for receiving a sequence of symbols to provide a time signal, a processing arrangement for applying a DFT of the resulting time signal providing No samples, an arrangement for inserting N1 pilot tones in the signal providing No+N1 tones, means for interpolating the signal provided with No+N1 tones to a required size, N, greater than No+N1, by insertion of zero tones of said DFT providing a modified frequency domain signal of N tones, where $N=2^m$, wherein m is an integer, an arrangement for insertion of zero bins in a middle section of the DFT providing a modified signal, a processing arrangement for applying Inversed Fast Fourier Transform (IFFT) on the modified signal, and an arrangement for performing a cyclic prefix insertion before transmitting the modified signal. The arrangement may further comprise means for insertion of N2 reserved tones instead of N1 pilot tones giving a signal consisting of No+N2 tones. Preferably, the arrangement comprises further means for insertion of N1 pilot tones and N2 reserved tones giving a signal consisting of No+N1+N2 tones. The arrangement may also comprise means for allocating a peak reduction energy allocated to N2 reserved tones for Envelope Peak Factor (EPF) reduction. Preferably, an arrangement for power ramp windowing of the time signal before transmitting may also be provided.

Moreover, the invention relates to a receiving arrangement for receiving a SC-FDMA modulated signal. The receiving arrangement comprises a receiver portion for a channel estimation using an N size FFT of the received signal, a processing arrangement for processing in the frequency domain, a processing arrangement for removing zero filled bins and reduces FFT size from N to one of No+N1 pilot tones or No+N2 reverse tones or No+N1+N2 pilot tones and reverse tones, a processing arrangement for removing said N1 pilot tones or N2 reverse tones or N1+N2 pilot tones and reverse tones so No tones or bins are left and a processing arrangement for recovering original time signal using an Inverse DFT (IDFT) operation.

The invention also relates to a base station comprising at least one of aforementioned arrangements.

The invention also relates to a user equipment comprising at least one of aforementioned arrangements.

BRIEF DESCRIPTION OF THE DRAWINGS

In the following, the invention is described in more detail with reference to accompanying drawings illustrating various exemplary embodiments, in which:

FIG. 1 illustrates the original OFDM EPF distribution generated from 50 random data sequences and the same distribution when peak reduction is done by reserved tone allocation.

FIG. 2 illustrates the generation of SC-FDMA modulation according to prior art,

FIG. 3 illustrates localized SC-FDMA FFT mapping, wherein

DETAILED DESCRIPTION OF PREFERRED EMBODIMENTS

In the following non-limiting description a method of achieving the same functionality as for OFDM transmission also for Localized and Distributed SC-FDMA modulations is disclosed.

For the rest of the description, the invention is described for localized SC-FDMA, however, a person skilled in the art will appreciate that the invention may also be applied to distributed SC-FDMA modulations.

There are different types of SC-FDMA mappings available: distributed or localized. The following example describes the localized mapping procedure.

Returning now to FIG. 2 the generation of SC-FDMA modulation is described

Figure 3A:
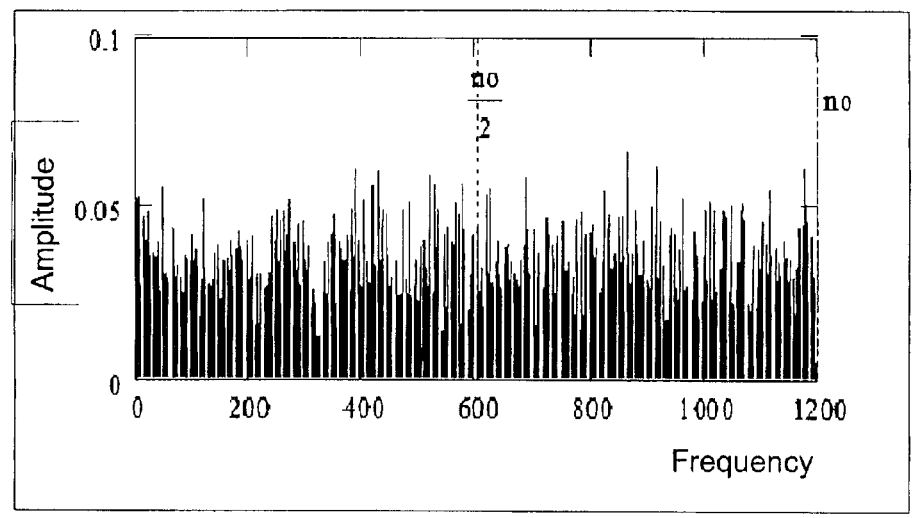
FIG. 3A illustrates FFT of No samples of 16QAM time generated modulation and FIG. 3B localised SC-FDMA FFT mapping into a N size FFT.
Figure 3B:
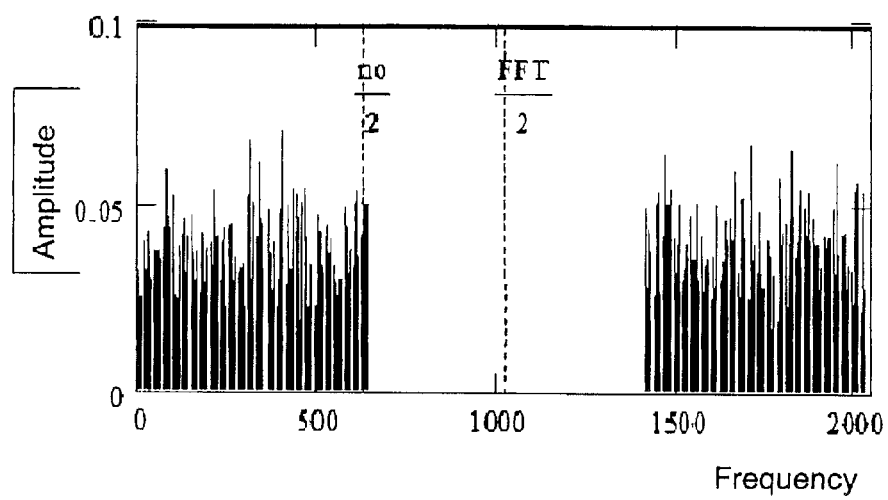

In FIGS. 3A and 3B the mapping into carriers of the time message DFT are shown for localized SC-FDMA. Zero filled FFT bins are inserted in the middle of the original No size bins DFT to do interpolation to a number of bins-carrier corresponding to $2^m$ value, where the efficient FFT and IFFT techniques can be used. The method is the same as over-sampling from No times the carrier frequency to N times the carrier frequency corresponding to a required FFT-size of which No sampled time symbols are used. By using the Inverse FFT (IFFT) technique the time signal is recovered but at a higher sample rate.

Figure 4:
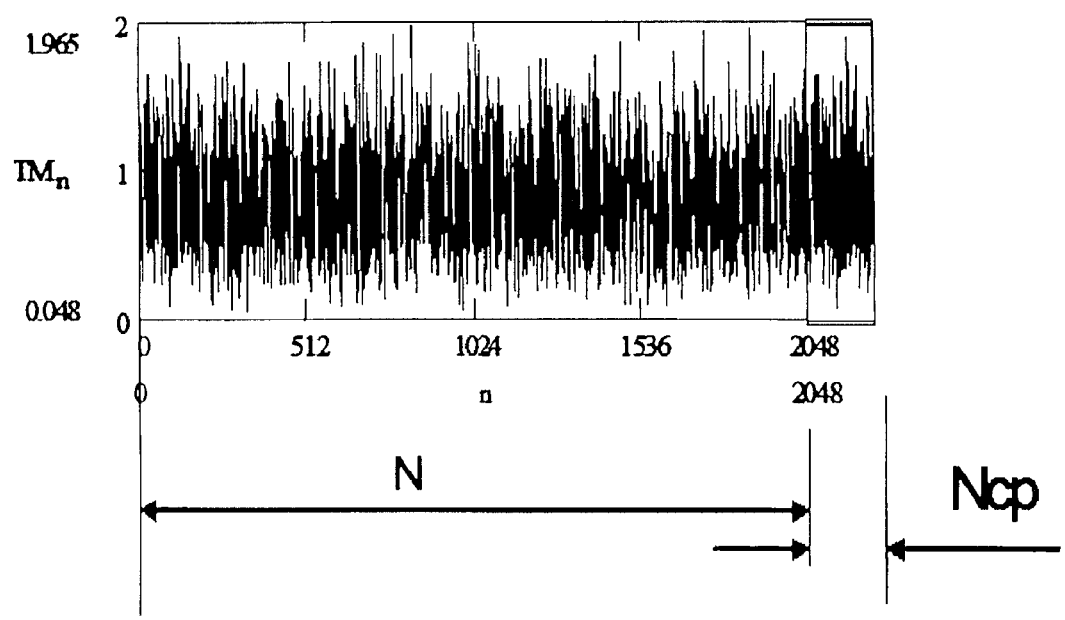
FIG. 4 illustrates $N_{cp}$ samples Cyclic Prefix addition to the original N samples long time signal obtained after IFFT processing.1

After recovering the time signal, the step is to provide the Cyclic Prefix (CP) insertion, (FIG. 4). As the IFFT is cyclic in time, the method is to add a cyclic prefix to the IFFT signal. "Ncp" samples from the beginning are added at the end of the time signal (or vice versa). The result is a N+Ncp time samples long signal. When transmitting the N+Ncp long signal to a receiver the receiver has redundant information so the signal equalizing can be done in the frequency domain instead of the time domain for normal time generated modulations. The transmitted "transferred time information" (TTI) is corresponding to "No" original symbol values of the initial time sequence.

The insertion of pilot tones according to the present invention is a straight forward method of modifying the SC-FDMA signal generation flow.

Figure 5:
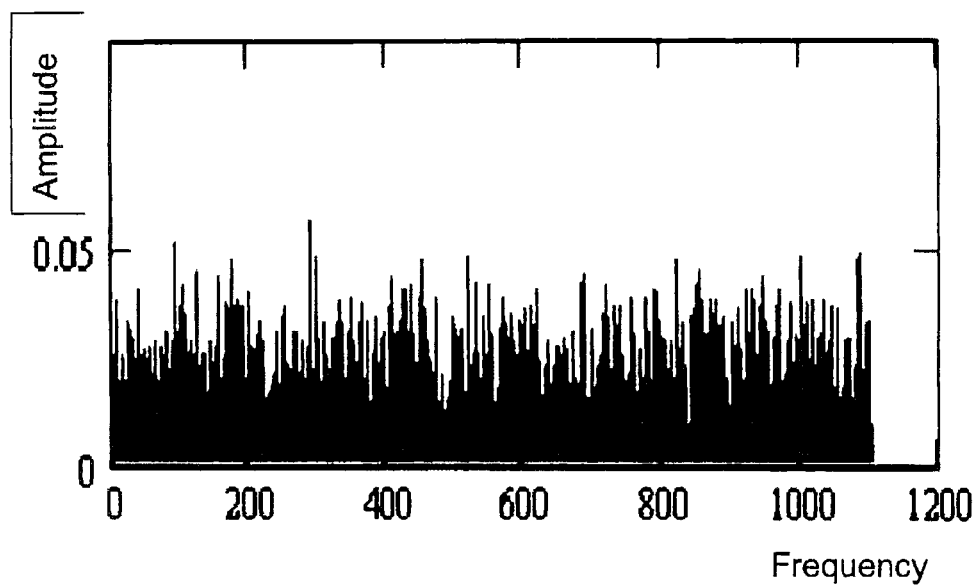
FIG. 5 illustrates original time signal DFT obtained from a 16-QAM time modulation 1100 samples long.
Figure 6:
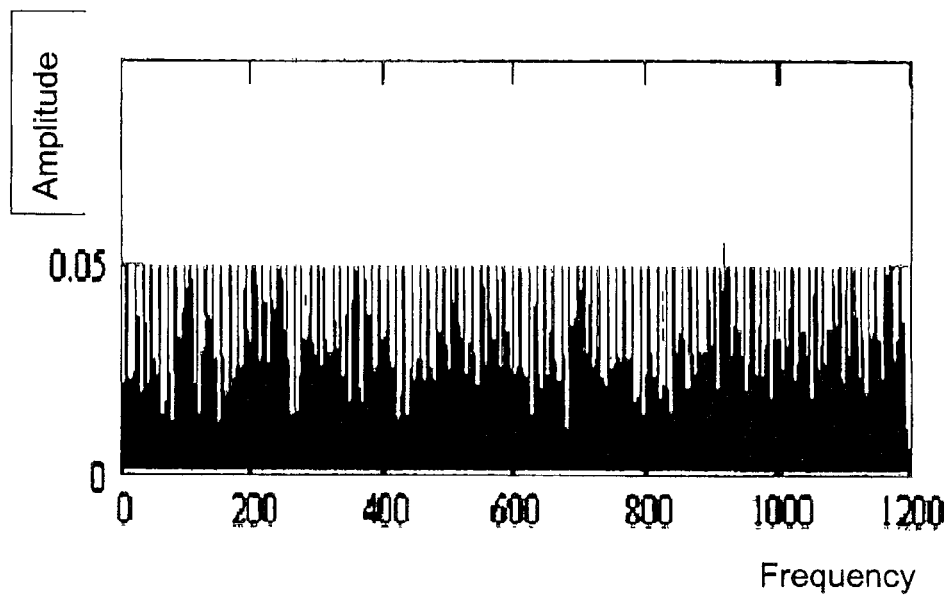
FIG. 6 illustrates message DFT (No=1100) with inserted pilot tones N1=100 as a mapping example applied to signal of FIG. 5.
Figure 7:
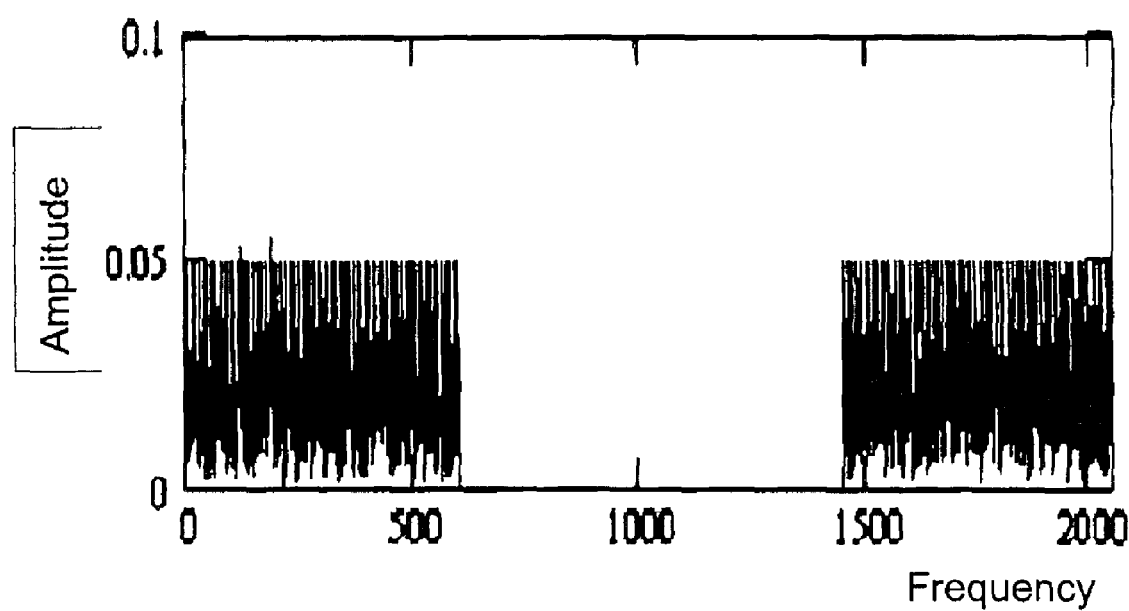
FIG. 7 is mapping example of the signal and the pilot tones into a 2048 tones/bins FFT of FIG. 6.
Figure 8:
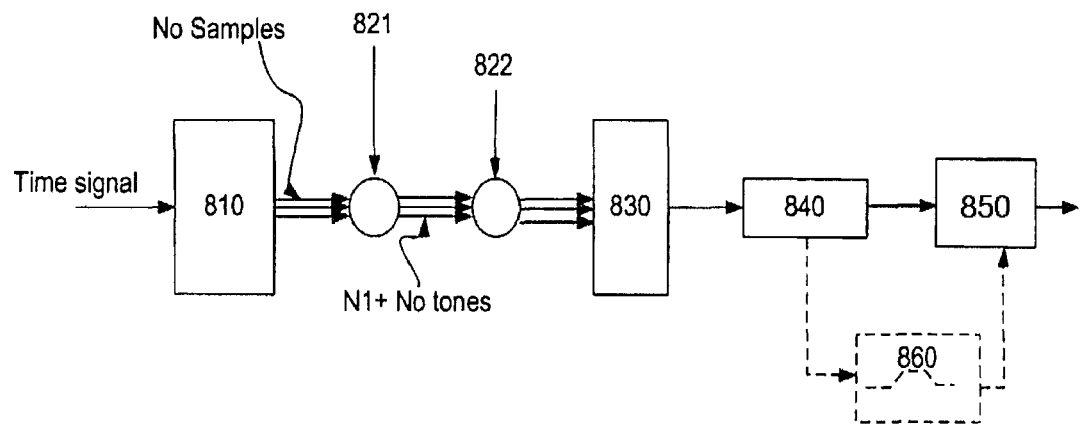
FIG. 8 is schematic block diagram of an arrangement according to the invention.

FIGS. 5 to 7 illustrate the solution for pilot application for SC-FDMA. FIG. 5 is the original time signal DFT, with No=1100. The method is as follows (see FIG. 8):
1. Apply the DFT (810) of the time signal for SC-FDMA providing No samples.
2. Insert (821) N1 amount of pilot tones (FIG. 6) into the original FFT giving No+N1 tones. The pilot tone spacing can be equidistant or randomly spread. (FIG. 6 shows an uniform spread of pilot tones.)
3. Interpolate (822) or map the tones to the required size N (where N is a $2^m$ value) and do IFFT 830, cyclic prefix insertion (840) etc. and transmit (850) the modified signal over the air interface.
4. Optionally a step of power ramp windowing (860) of the time signal before transmitting is performed.
5. At reception a channel (FIG. 19) estimation is done using an N size FFT (1970) of the received signal. After signal processing in the frequency domain, remove (1980) the zero filled bins and reduce the FFT size from N to No+N1 tones. Then the N1 pilot tones are removed (1985) so No tones or bins are left. The original time signal is then recovered by an Inverse DFT (IDFT) (1990) operation.

Figure 9:
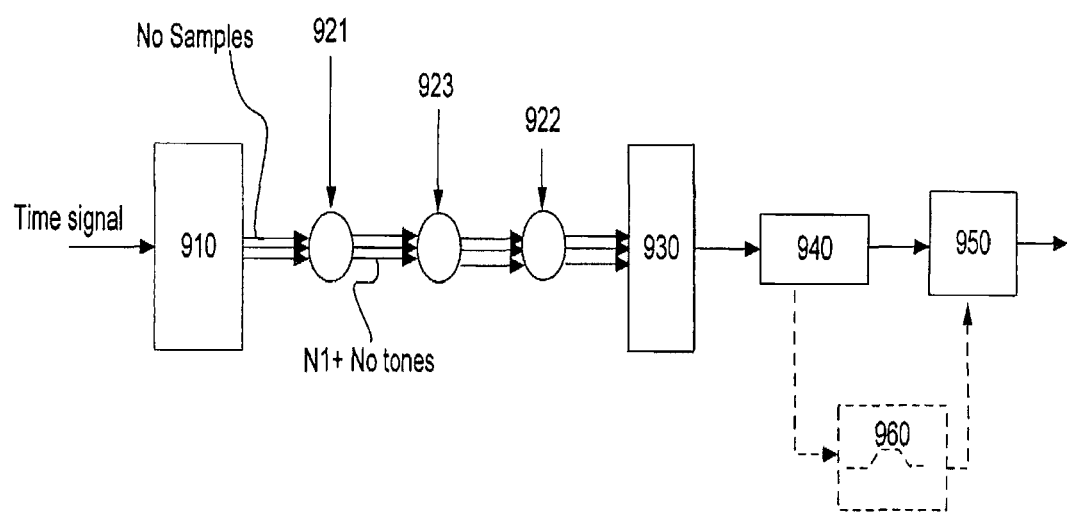
FIG. 9 is schematic block diagram of an arrangement according to the invention.

In the same manner as for inserting pilot tones for calibration as mentioned above, the OFDM methods of allocation special reserved tones for EPF reduction can be applied. The procedure is as follows (FIG. 9)
1. Apply the DFT (910) of the time signal for SC-FDMA providing No samples.
2. Insert (921) N1 amount of pilot tones into the original FFT giving No+N1 tones. The pilot tone spacing can be equidistant or randomly spread. When pilot tones are not used N1=0 and No can be a higher number.

3. Insert (923) N2 reserved tones to be used for EPF reduction. The result is a frequency domain signal having No+N1+N2 tones or bins.
4. Interpolate (922) to the required size N (where N is a $2^m$ value) and do IFFT (930), cyclic prefix insertion (940) etc. and transmit (950) the modified signal over the air interface.
5. Optionally a step of power ramp windowing (960) of the time signal before transmitting is performed.
6. At reception (FIG. 20) a channel estimation is done using an N size FFT (2070) of the received signal. After signal processing in the frequency domain, remove (2080) the zero filled bins and reduce the FFT size from N to No+N1+N2 tones. Then the N1 pilot tones and the N2 reserved tones are removed (2085) so No tones or bins are left. The original time signal is then recovered by an Inverse DFT (IDFT) (2090) operation.

Other optional signal processing at reception may include:
performing a channel estimation in the frequency domain using an N size FFT of the received signal,
removing tones corresponding to the transmitted zero tones and reducing said FFT size from N to No+N2 tones, when no pilot tones are transmitted
removing N2 reserved tones such that No tones or bins are left, and
recovering the original No samples long time signal by an Inverse DFT (IDFT) operation Or:
Performing a channel estimation in the frequency domain using an N size FFT of the received signal, using earlier sent pilot tones
removing tones corresponding to the transmitted zero tones and reducing said FFT size from N to No tones, when no pilot tones and reserved tones are transmitted, and
Recovering the No samples long original time signal by an Inverse DFT (IDFT) operation.

Figure 10:
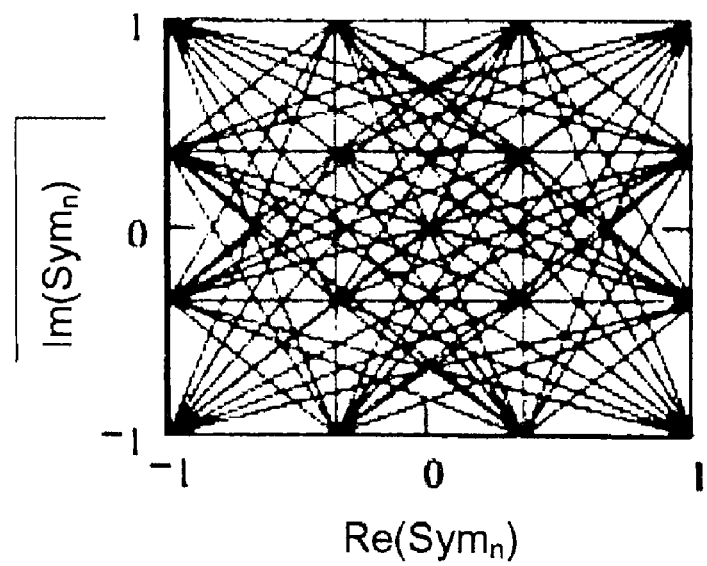
FIG. 10 is a symbol diagram plot for a 16 QAM time signal.
Figure 11:
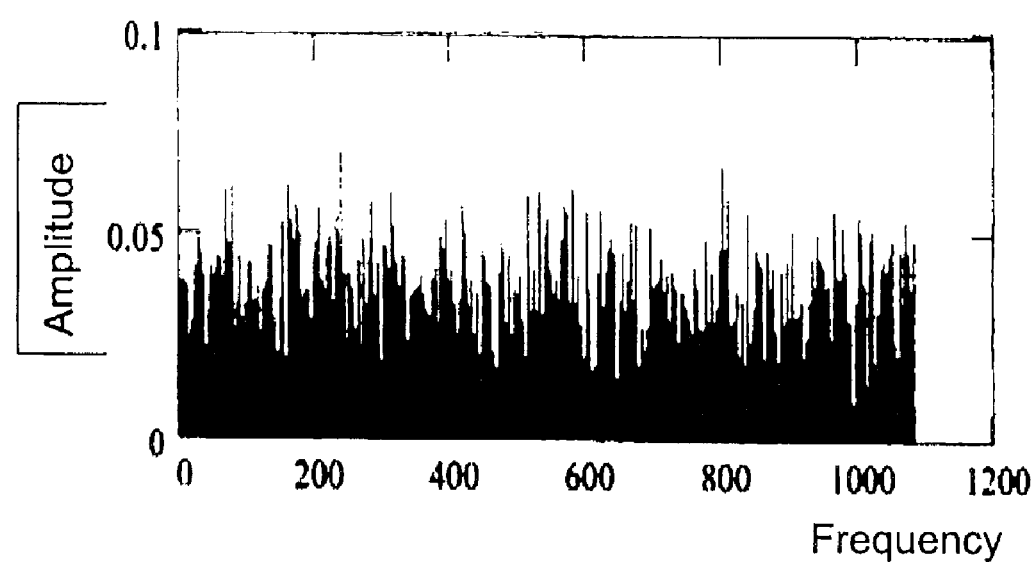
FIG. 11 is diagram plot for DFT of time signal according to FIG. 10.
Figure 12:
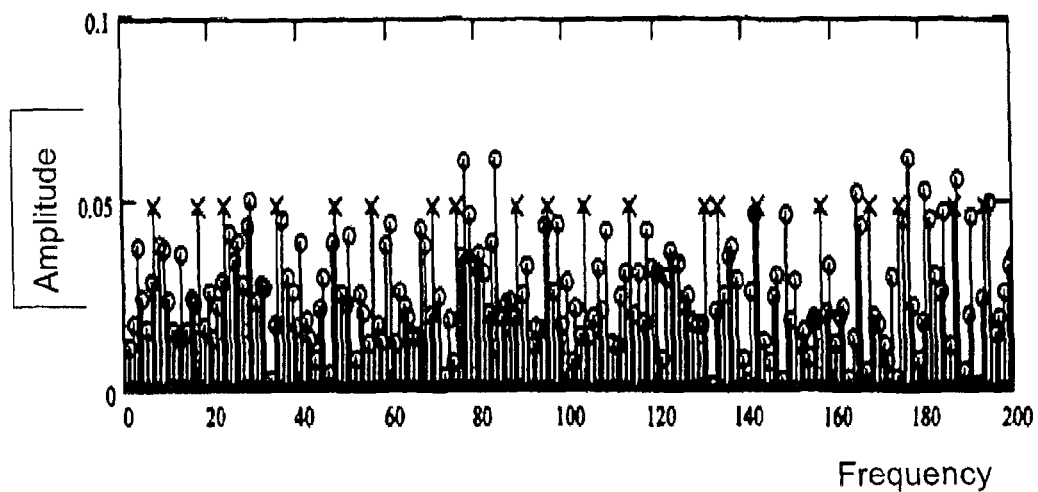
FIG. 12 is diagram plot for DFT signal with inserted positions for randomly spaced reserved tones according to FIG. 11.
Figure 13:
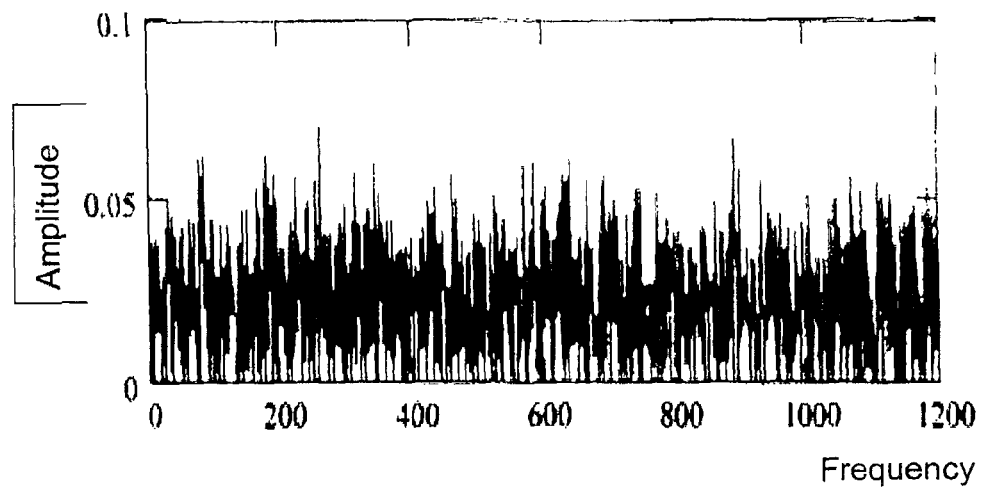
FIG. 13 is diagram plot for DFT signal with reserved tones of zero amplitude.
Figure 14:
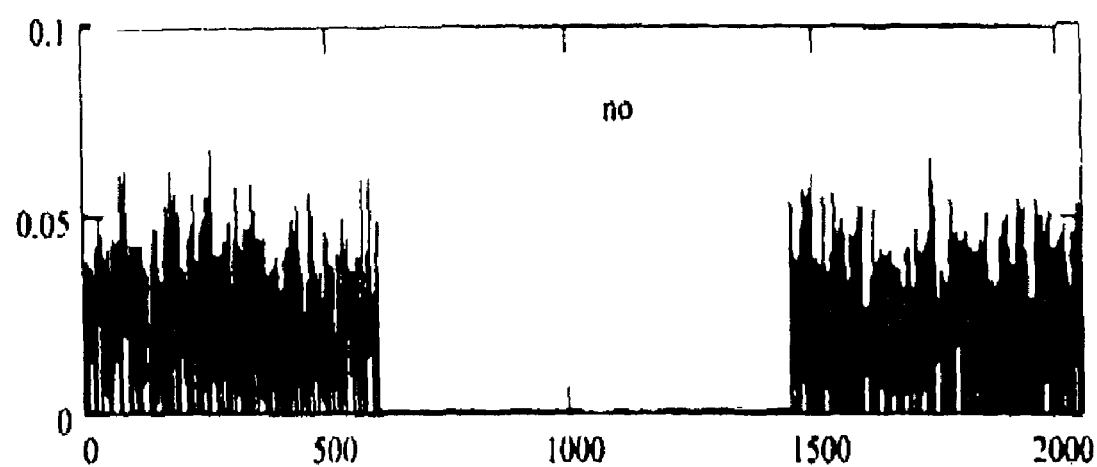
FIG. 14 is diagram plot for DFT mapping into a 2048 bin FFT
Figure 16:
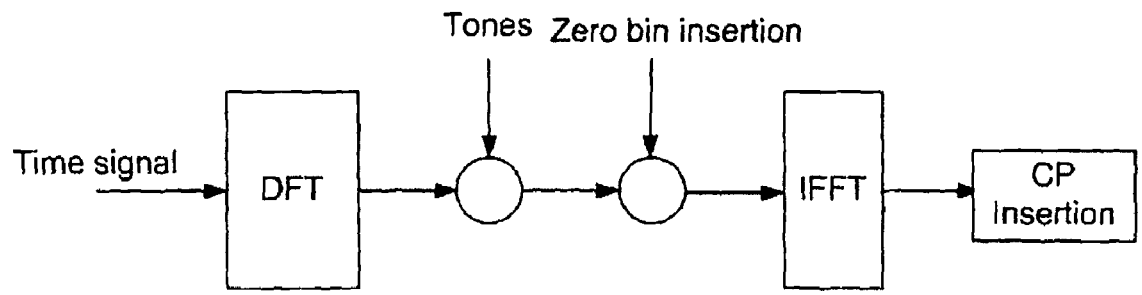
FIG. 16 is schematic block diagram of an arrangement according to an example in accordance to the present invention.

The following example in conjunction with FIG. 16 illustrates an application of the invention:

Assume that a 16 QAM signal is generated in time domain (illustrated in symbol diagram of FIG. 10). A OFT of the time signal is carried out (FIG. 11). FIG. 12 illustrates tones randomly spaced inserted in the OFT. For illustrative reason, the position of the tones are marked by x:s while the signal DFT is marked by o:s. For clarity reason only the 200 first bins in the OFT are shown. The amount if OFT bins is increased from 1080 to 1200 by the reserved tone insertion. For convenience only the first 200 tones are shown. FIG. 13 illustrates the original OFT signal where the reserved tones are of zero amplitude. Then the OFT signal is rearranged to 2048 bins by insertion of zero tones, as illustrated in FIG. 14. This is the same as interpolation in the FFT domain.

After that an IFFT is executed and a new time signal is achieved and cyclic prefix is added.

The signal is transmitted over the air and received by a receiver. After OFDM type equalisation a FTT of 2048 tones are generated. A DFT of 1200 tones is done by removing the tones in the middle.

Figure 15:
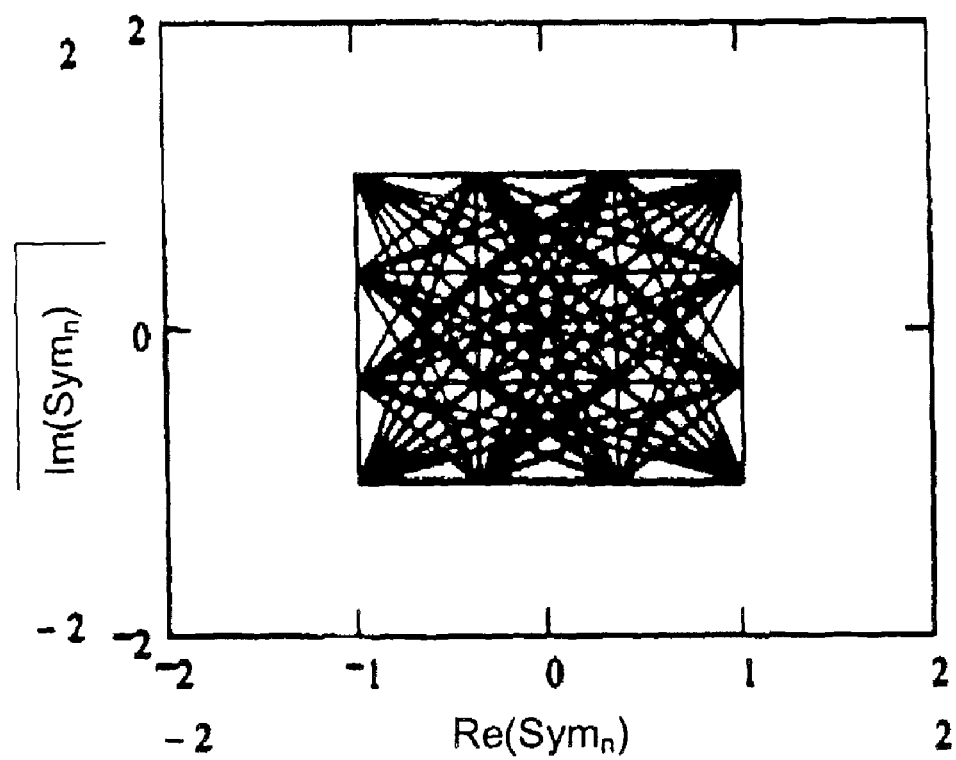
FIG. 15 is the time signal recovered by a receiver after inverse signal processing steps as for the signal generation.

Then the reversed tones are removed leaving a OFT of 1080 tones that contains the time symbol message. The time signal message is recovered by an inverse OFT as illustrated in FIG. 15.

Consequently, the advantages of using SC-FDMA modulation according to the invention include:
Using a fairly simple equaliser used for OFDM,
The pilot tone procedure is equal as for OFDM,
The reserved tone clip algorithms proposed for OFDM can be used.
The overall achieved EPF is at least 1 dB lower than for the comparable OFDM signal with the same 16-QAM modulation scheme.
The use of SC-FDMA according to the invention gives OFDM spectrum efficiency but with reduced EPF.

Figure 17:
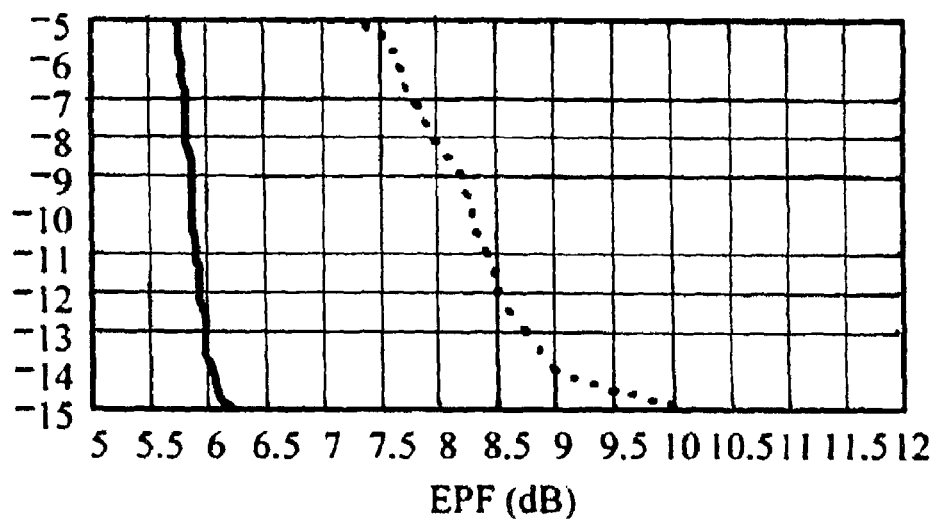
FIG. 17 illustrates 16QAM SC-FDMA EPF distribution and clip performance according to the present invention.

The clip procedures for the novel SC-FDMA modulation have been investigated and shown according to FIG. 1; see FIG. 17. The dotted curve is the original signal EPF distribution. A 1 dB improvement in EPF compared to OFDM EPF in FIG. 1 means that a system with higher efficiency can be made by using SC-FDMA according to the present invention and less over dimensioned analogue power amplifiers can be used.

Figure 18:
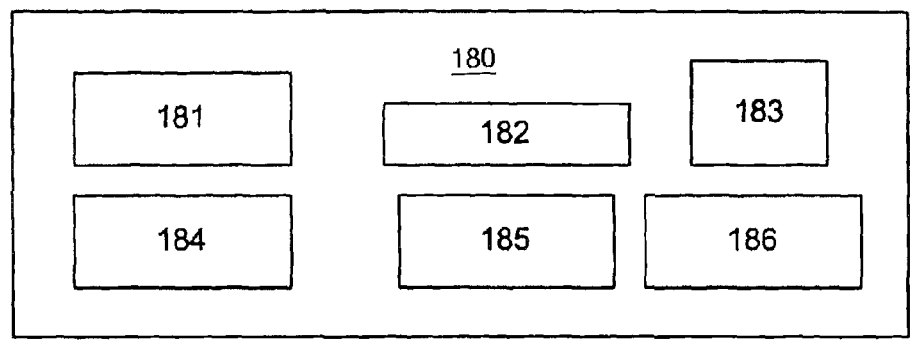
FIG. 18 is a block diagram of an arrangement for implementing the present invention.

The method of the invention can be implemented through one or more processing arrangements in transmit and/or receive nodes of a communication system. An exemplary embodiment of such arrangement is illustrated in FIG. 18. The arrangement 180 comprises a signal generation portion 181 for receiving a time symbols, a processing arrangement 182 for applying a OFT of a time signal providing No samples, an arrangement 183 for inserting N1 pilot tones in the signal providing No+N1 tones, means 183 for interpolating/mapping the signal provided with No+N1 tones to a required tone size of N by zero tone insertion, a processing arrangement 184 for applying Inversed Fast Fourier Transform (IFFT) on the modified signal, and an arrangement 185 for performing a cyclic prefix insertion and/or power ramp windowing before transmitting the modified signal. Optionally, an arrangement 186 for power ramp windowing of the time signal before transmitting may also be incorporated.

Figure 19:
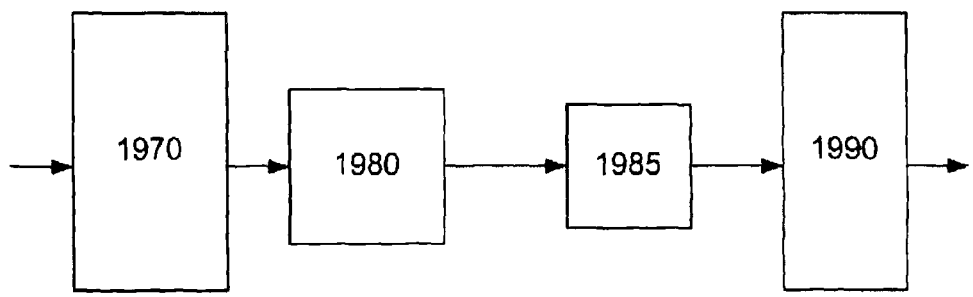
FIG. 19 is a block diagram of an arrangement for implementing the present invention at the reception site.

A receiving arrangement according to FIG. 19 comprises a receiver portion for a channel estimation using an N size FFT (1970) of the received signal. After signal processing in the frequency domain, a processing arrangement removes the zero filled bins and reduces the FFT size from N to No+N1 tones (1980). Then the processing arrangement removes the N1 pilot tones so No tones or bins are left (1985). The original time signal is then recovered by means of the processing arrangement using an Inverse DFT (IDFT) operation (1990).

Figure 20:
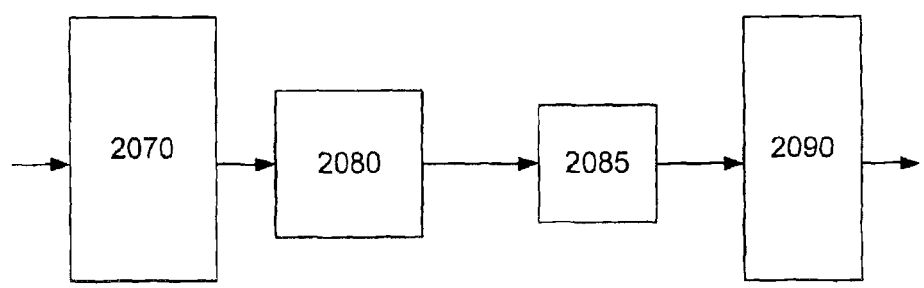
FIG. 20 is a second block diagram of an arrangement for implementing the present invention at the reception site.

A receiving arrangement according to FIG. 20 comprises a receiver portion for a channel estimation using an N size FFT (2070) of the received signal. After signal processing in the frequency domain, a processing arrangement removes the zero filled bins and reduces the FFT size from N to No+N1 or No+N2 or No+N1+N2 tones (2080). Then the processing arrangement removes the N1 or N2 or N1+N2 pilot tones and reverse tones so No tones or bins are left (2085). The original time signal is then recovered by means of the processing arrangement using an Inverse DFT (IDFT) operation (2090).

Figure 21:
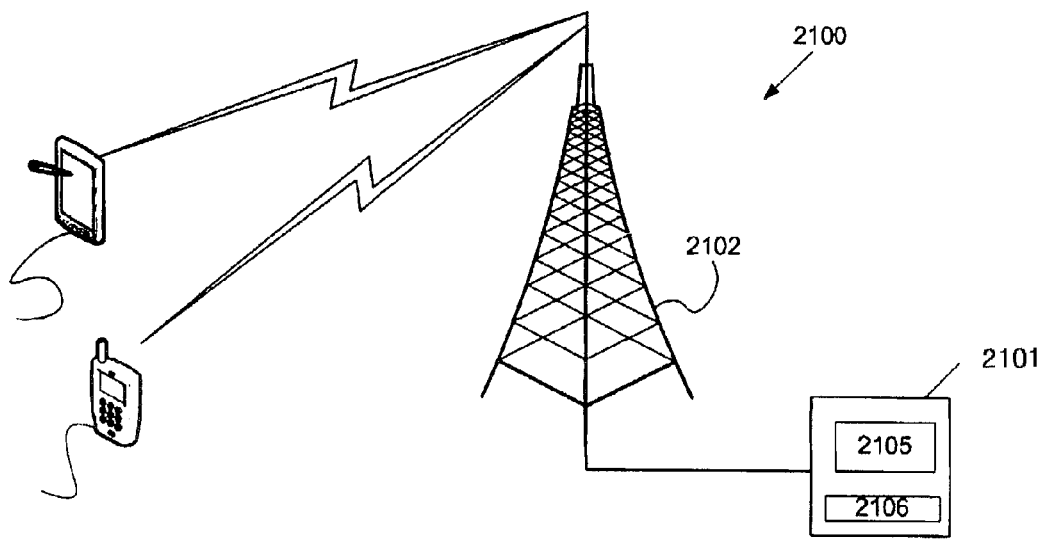
FIG. 21 shows schematically a communications network implementing the present invention at the reception site.

FIG. 21 illustrates a schematic communication network 2100 comprising a base station 2101 having a transmit/receipt antenna 2102 and a mobile user devices 2103 and 2104 such as a mobile phones, computers etc., within the transmission range. Consequently, each of the user devices and the base station is arranged with an arrangement as described above in conjunction with FIG. 18 and the aforementioned receiving arrangement, 2105 and 2106, respectively, (not illustrated inside the user equipments).

The present invention is not limited to the above-describe preferred embodiments. Various alternatives, modifications and equivalents may be used. Therefore, the above embodiments should not be taken as limiting the scope of the invention, which is defined by the appending claims

The invention claimed is:

1. A method of enhancing the efficiency of a transmission using Single Channel-Frequency Division Multiple Access (SC-FDMA), the method comprising the steps of:
applying a Discrete Fourier Transformation (DFT) of a time signal providing $N_0$ samples to produce a first signal;
inserting $N_1$ pilot tones allocated to channel estimation and $N_2$ reserved tones allocated to peak reduction into the first signal to produce a DFT signal having $N_0+N_1+N_2$ tones;
interpolating the DFT signal to a predetermined size N, with N being a value greater than $N_0+N_1+N_2$, by inserting zero tones of the DFT signal to produce a modified frequency domain signal having N tones, wherein $N=2^m$ with m being an integer;
applying Inversed Fast Fourier Transform (IFFT) on the modified frequency domain signal;
adding a cyclic prefix to create a signal to be transmitted;
applying peak reduction energy to the $N_2$ reserved tones allocated for peak reduction; and
transmitting the signal.

2. The method of claim 1 further comprising the step of performing power ramp windowing of the signal before transmitting.

3. The method of claim 1 wherein the spacing of the $N_1$ and $N_2$ pilot and reserved tones is either equidistant or randomly spread.

4. The method of claim 1 wherein interpolating the DFT signal to a predetermined size N by inserting zero tones comprises inserting the zero tones in the center of the DFT signal samples.

5. A method of receiving, in a Single Channel-Frequency Division Multiple Access (SC-FDMA), a transmitted signal having pilot tones for channel estimation and reserved tones for peak reduction inserted therein, comprising:
performing a channel estimation in the frequency domain using an N size Fast Fourier Transform (FFT) of the received signal;
removing extra pilot tones and reserved tones that have been transmitted in the received signal;
removing tones corresponding to transmitted zero tones;
reducing the FFT size from N to $N_0$ tones; and
recovering the original $N_0$ samples in a time domain signal by an Inverse Discrete Fourier Transform (DFT) operation.

6. An arrangement configured to process a signal for transmission using Single Channel Frequency Division Multiple Access (SC-FDMA), the arrangement comprising:
a symbol receiver configured to receive a sequence of symbols to provide a time domain signal;
a processing arrangement configured to compute a Discrete Fourier Transformation (DFT) of the time domain signal to produce a first signal having $N_0$ samples;
a first arrangement configured to insert $N_1$ pilot tones allocated to channel estimation and $N_2$ reserved tones allocated to peak reduction into the first signal to produce a DFT signal having $N_0+N_1+N_2$ tones;
an interpolator configured to interpolate the DFT signal having $N_0+N_1+N_2$ tones to a predetermined size N, with N being a value that is greater than $N_0+N_1+N_2$, by inserting zero tones in the DFT signal to produce a modified frequency domain signal of N tones, wherein $N=2^m$ with m being an integer;
a processing arrangement configured to apply Inversed Fast Fourier Transform (IFFT) on the modified frequency domain signal;
a processing arrangement configured to add a cyclic prefix to symbols in the modified frequency domain signal to create a signal to be transmitted;
a processing arrangement configured to apply peak reduction energy to the $N_2$ reserved tones allocated for peak reduction; and
a transmitter configured to transmit the peak-reduced signal.

7. The arrangement of claim 6 further comprising a processing arrangement configured to power ramp window the signal before transmitting the signal.

8. The arrangement of claim 6 wherein the first arrangement is further configured to insert $N_1$ pilot tones and $N_2$ reserved tones either equidistantly or randomly spread.

9. The arrangement of claim 6 wherein the interpolator is configured to insert the zero tones in the center of the DFT signal samples.

10. A receiver for receiving a Single Channel-Frequency Division Multiple Access (SC-FDMA) modulated signal having pilot tones for channel estimation and reserved tones for peak reduction inserted therein, the receiver comprising:
a receiver portion configured to perform a channel estimation using an N size Fast Fourier Transform (FFT) of the received signal;
a first processing arrangement configured to process the received signal in the frequency domain;
a second processing arrangement configured to remove zero filled bins, and to reduce the FFT size of the received signal from N to $N_0+N_1+N_2$ signal tones, pilot tones and reserved tones;
a third processing arrangement configured to remove the $N_1+N_2$ pilot tones and reserved tones from the received signal such that $N_0$ tones remain;
a fourth processing arrangement configured to recover a time domain signal using an Inverse Discrete Fourier Transform (DFT) operation.

11. The arrangement of claim 10 wherein the arrangement comprises a base station.

12. The arrangement of claim 10 wherein the arrangement comprises user equipment.

* * * * *

UNITED STATES PATENT AND TRADEMARK OFFICE
CERTIFICATE OF CORRECTION

| | | |
|---|---|---|
| PATENT NO. | : 7,948,868 B2 | |
| APPLICATION NO. | : 12/377942 | |
| DATED | : May 24, 2011 | |
| INVENTOR(S) | : Sahlman | |

It is certified that error appears in the above-identified patent and that said Letters Patent is hereby corrected as shown below:

On the Title Page, in Field (75), under "Inventor", in Column 1, Line 1, delete "Karl-Göstra" and insert -- Karl-Gösta --, therefor.

In Column 2, Line 47, delete "FTT" and insert -- FFT --, therefor.

In Column 5, Lines 21-22, delete "processing.1" and insert -- processing, --, therefor.

In Column 7, Line 42, delete "OFT" and insert -- DFT --, therefor.

In Column 7, Line 44, delete "OFT." and insert -- DFT. --, therefor.

In Column 7, Line 47, delete "OFT" and insert -- DFT --, therefor.

In Column 7, Line 47, delete "OFT" and insert -- DFT --, therefor.

In Column 7, Line 50, delete "OFT" and insert -- DFT --, therefor.

In Column 7, Line 51, delete "OFT" and insert -- DFT --, therefor.

In Column 7, Line 60, delete "reversed" and insert -- reserved --, therefor.

In Column 7, Line 60, delete "OFT" and insert -- DFT --, therefor.

In Column 7, Line 62, delete "OFT" and insert -- DFT --, therefor.

In Column 8, Line 22, delete "OFT" and insert -- DFT --, therefor.

In Column 9, Line 45, in Claim 5, delete "(DFT)" and insert -- (IDFT) --, therefor.

Signed and Sealed this
Twenty-fifth Day of October, 2011

David J. Kappos
*Director of the United States Patent and Trademark Office*

In Column 9, Line 48, in Claim 6, delete "Channel Frequency" and insert -- Channel-Frequency --, therefor.

In Column 10, Line 48, in Claim 10, delete "(DFT)" and insert -- (IDFT) --, therefor.